Patented Aug. 10, 1943

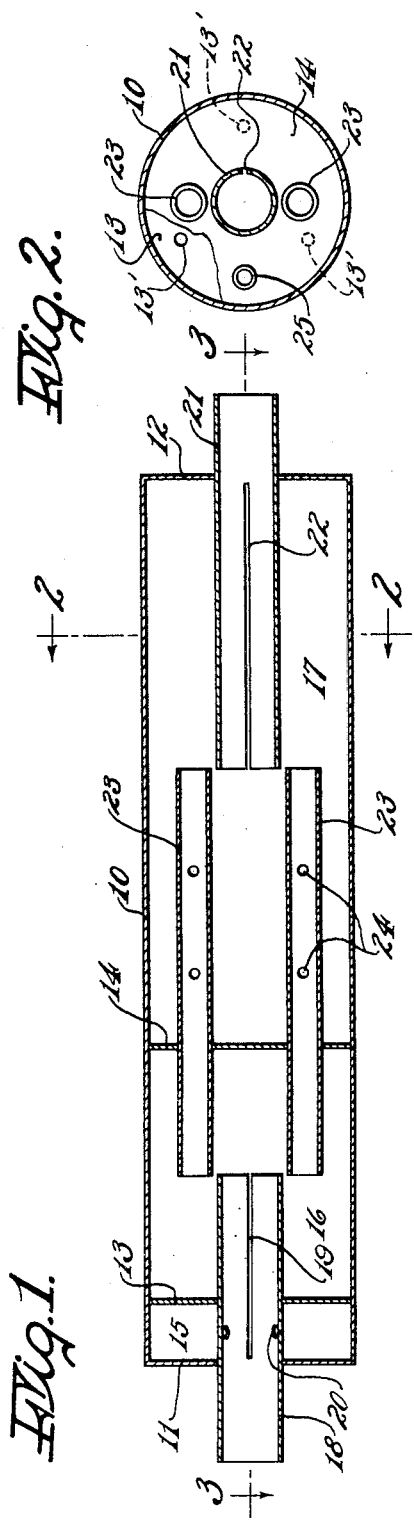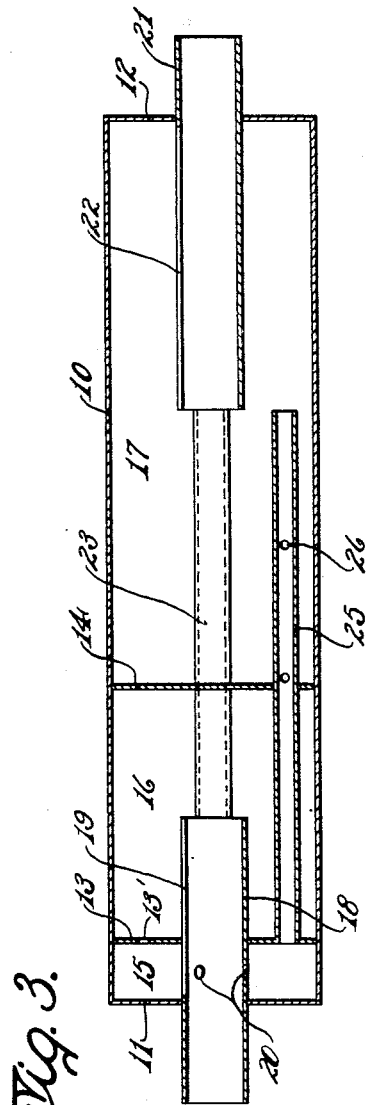

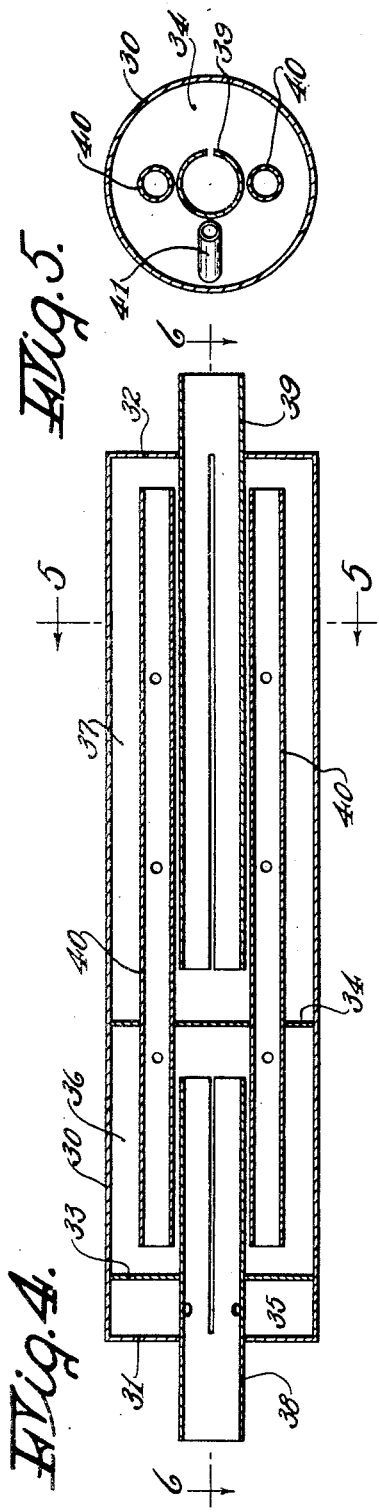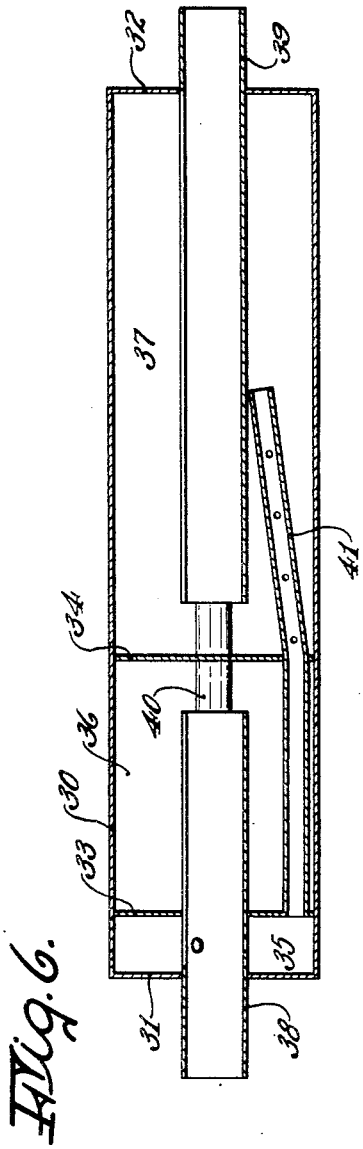

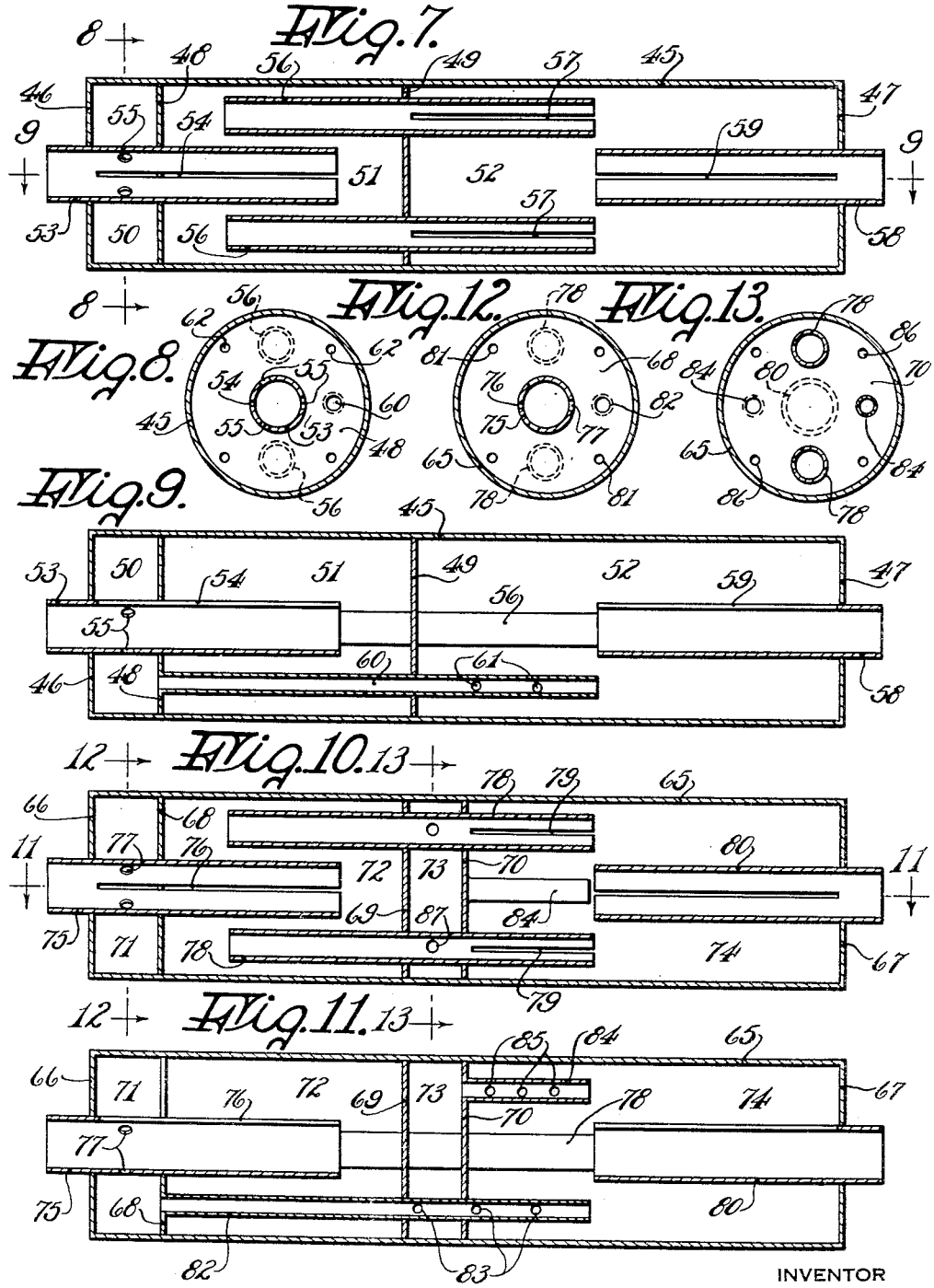

2,326,613

UNITED STATES PATENT OFFICE 2,326,613

SILENCER

Roland B. Bourne, West Hartford, and John P. Tyskewicz, Hartford, Conn., assignors to The Maxim Silencer Company, Hartford, Conn., a corporation of Connecticut Application February 7, 1942, Serial No. 429,862

7 Claims. (Cl. 181—53)

This invention relates to exhaust silencing devices and has particular reference to silencers operating upon the expansion chamber principle of the general type shown in the Bourne Patent 2,264,195, November 25, 1941. One object of the invention is to improve upon devices of this general character so that the silencing effect of several chambers will be improved. A further object is to provide a device of this general character which will have unusually low back pressure. Additional objects will appear from the following description and claims.

The invention will now be described with reference to the accompanying drawings in which:

Fig. 1 is a longitudinal section through a silencer embodying the invention;

Fig. 2 is a section on line 2—2 of Fig. 1;

Fig. 3 is a section on line 3—3 of Fig. 1;

Fig. 4 is a longitudinal section of a modified form of silencer embodying the present invention;

Fig. 5 is a section on line 5—5 of Fig. 4;

Fig. 6 is a section on line 6—6 of Fig. 4;

Fig. 7 is a longitudinal section through a further modification;

Fig. 8 is a section on line 8—8 of Fig. 7;

Fig. 9 is a section on line 9—9 of Fig. 7;

Fig. 10 is a longitudinal section through a modified form;

Fig. 11 is a section on line 11—11 of Fig. 10;

Fig. 12 is a section on line 12—12 of Fig. 10; and

Fig. 13 is a section on line 13—13 of Fig. 10.

Referring to the form shown in Figs. 1 to 3, the cylindrical casing 10 having end headers 11 and 12 is provided with intermediate partitions 13 and 14 which divide the interior of the casing into chambers 15, 16, and 17. Extending through the header 11 is a conduit 18 which preferably serves as the inlet conduit. This conduit passes through the partition 13 and in the form shown terminates close to the mid-point of the chamber 16. The conduit 18 is coupled to the chamber 15 through a slot 19 and a series of holes 20 which, assuming for example a conduit 2¾ inches in diameter, may be three holes each ⅜ inch diameter or the equivalent. The chamber 15 in this case will be about 2¾ inches long with a 10 inch diameter of the casing. The chamber 16 is made about 12 inches long and the conduit 18 communicates with it not only through its open end but also through the slot 19, which may be ⅛ inch wide. The transverse header 13 is provided with the peripherally located holes 13′, in this case three equi-spaced holes .35 inch in diameter. The purpose of these holes is to afford a small but direct path so that gas pulses in the chamber 15 may enter, in an attenuated form, the chamber 16 where they become mixed with the pulses entering chamber 16 through the slotted conduit 18. A path differential is thus established. Another purpose of the holes 13′ is to prevent standing waves in the chamber 16, the combination of the holes 13′ and the chamber 15 conspiring to offer a cushioning effect on such waves in the chamber 16. The use of these holes results in additional attenuating effect for low frequencies of at least three decibels. The total back pressure is also slightly reduced. The size and number of holes will vary, of course, with the dimensions of the silencer, but the dimensions given are substantially correct for the embodiment shown. The invention is not restricted to these proportions, but they may serve as an illustrative example. Extending through the header 12 is a conduit 21 which extends approximately one-half way into chamber 17 and communicates with it not only through its open end but also through a slot 22.

The chambers 16 and 17 are connected by a plurality of tubes 23 preferably provided with holes 24 as described in the patent referred to. In addition to the conduits described and, which in general find their counterparts in the cited patent, the chamber 16 is connected to the chamber 17 by a relatively small conduit 25. Thus, if the conduits 23 are two in number and are 1½ inches in diameter, as will be found suitable for the purpose, the conduit 25 may be ¾ inch in diameter. This conduit also has a series of holes 26 preferably arranged at the half and quarter points and serving both to prevent shock excitation of the conduit and to bleed some of the gas and sound waves into the chambers 16 and 17, the remainder passing through the open end of the conduit 25.

In the form shown in Figs. 4 to 6 the casing 30 with headers 31 and 32 is divided by partitions 33 and 34 into chambers 35, 36, and 37. Inlet and outlet conduits 38 and 39, and conduits 40 connecting the chambers 36 and 37 are arranged substantially as described in the first form, with the exception that the conduits overlap a substantial amount, preferably terminating near the headers or partitions at a distance on the order of the diameter of the conduit. In this case also a conduit 41 is provided which connects the chamber 35 with the chamber 37 and which may if desired be provided with suitable anti-resonating holes as previously described. The pipe 41 is preferably bent toward the axis of the chamber 37 as shown in Fig. 6, as it has been found that this type of construction will reduce the back pressure approximately 3%.

The operation of the device described is to equalize gas pulses and reduce the intensity of sound waves by providing for them a plurality of paths of different lengths. By carrying a portion of the gas and sound waves directly to the chamber 37 through the pipes 25 and 41 the efficiency of the silencer is greatly improved. At the same time it should be noted that the conduits 23 and 40 are located relatively close to the axial inlet and outlet conduits. It has been found that by so doing the back pressure is substantially reduced, apparently because the gases coming through pipe 38, for example, tend to pass to the outside of the chamber 36, flow rearwardly along the outer shell, and then again resume a forward direction in adjacency to the outside of the conduit 38. The action is something like the formation of a smoke ring, and the presence of the conduits 40 in the natural path of the gas causes less disturbance than if they were arranged further away from the central conduits. Apparently the bending of the pipe 41 toward the center has a similar effect. It will be understood that the dimensions given are illustrative only and represent one form of device which has been found particularly satisfactory. The invention may be employed in devices having other proportions.

Referring next to the form of device shown in Figs. 7, 8 and 9, the entire silencer is enclosed in a generally cylindrical casing 45 having end headers 46 and 47. Intermediate partitions 48 and 49 divide the casing into chambers 50, 51, and 52. Through the header 46 and the partition 48 extends a conduit 53 having an open end within the chamber 51 and having lateral escape openings, such as slot 54 and apertures 55 within chambers 50 and 51. The silencer may be run with either end as the inlet but it is preferable to use the conduit 53 as the inlet pipe. Considering first the portion of the gas that passes into the chamber 51, it will be seen that a portion of this will go through the open end of the conduit and a portion through the slot 54. The gas within the chamber 51 passes through a plurality of conduits 56 which discharge both through open ends and through lateral slits 57 into chamber 52. Finally the gas is taken from chamber 52 through a conduit 58 having a lateral slot 59. The opposed conduits within the chambers may be overlapping as in chamber 51 or may terminate near the mid-point near chamber 52. In addition to these passages for the gas additional paths are provided. As previously mentioned, gas discharges from the conduit 53 into chamber 50 both through slot 54 and holes 55. From the chamber 50 two courses are open. The first path is through a tube 60 (Figs. 8 and 9) of relatively small cross section having an open end within the chamber 52 and being provided with lateral openings 61 in that chamber. This provides a path directly from the chamber 50 to the non-adjacent chamber 52. The partition 48 is also provided with a series of holes 62 leading directly into the chamber 51. It has been found that with this type of construction an improved silencing action having very low back pressure will be obtained.

In the device of Figs. 10 to 13 the outer casing 65 is provided with end headers 66 and 67 and with a plurality of partitions 68, 69, and 70. Chambers 71, 72, 73, and 74 are thus formed. Gas passes into a silencer through a conduit 75 having an open end within chamber 72 and lateral escape openings 76 and 77 within the chambers 72 and 71. Conduits 78 take the gas from chamber 72 and deliver it through an open end and through a lateral opening 79 into the chamber 74 from whence it is exhausted through a slotted conduit 80. In addition to these gas paths the chamber 71 is connected to chamber 72 through holes 81 and to chambers 73 and 74 through a conduit 82 having an open end within chamber 74 and a series of lateral openings 83 into chambers 73 and 74. Chamber 73 is also provided with one or more conduits 84 leading into chamber 74 and preferably provided with lateral escape openings 85. In addition the partition 70 may be provided with a series of small holes 86 leading directly into the chamber 74. The purpose of these holes is as set forth in connection with the device of Fig. 1. In the various cases where discrete holes are used in conduits like 49 they are preferably placed at the half, quarter and eighth points in order to prevent shock excitation of the conduit as is described in the Bourne Patent 2,264,195. The chamber 73 may also be connected to pipe 82 through certain of the holes 83 and to conduits 78 through holes 87.

What we claim is:

1. A silencer comprising a substantially cylindrical casing divided transversely by a plurality of partitions into a series of chambers, an inlet conduit extending through the first chamber and having an open end within the second chamber and one or more openings into the first chamber, one or more conduits each provided with open ends in both second and third chambers and with one or more lateral escape openings, an exhaust conduit provided with one or more lateral escape openings and with an open end in the third chamber, and a conduit extending from the first chamber through the second chamber and having an open end within the third chamber.

2. A silencer comprising a substantially cylindrical casing divided transversely by a plurality of partitions into a series of chambers, an inlet conduit extending through the first chamber and having an open end within the second chamber and one or more openings into the first chamber, one or more conduits each provided with open ends in both second and third chambers and with one or more lateral escape openings, an exhaust conduit provided with one or more lateral escape openings and with an open end in the third chamber, a conduit extending from the first chamber through the second chamber and having an open end within the third chamber, and holes through at least one of said partitions directly connecting the adjacent chambers.

3. A silencer comprising a substantially cylindrical casing divided transversely by a plurality of partitions into a series of chambers of lengths increasing progressively from the inlet to the outlet end, an inlet conduit extending through the first chamber and having an open end within the second chamber and one or more openings into the first chamber, one or more conduits each provided with open ends in both second and third chambers and with one or more lateral escape openings, an exhaust conduit provided with an open end in the third chamber and with one or more lateral escape openings, and a conduit extending from the first chamber through the second chamber and having an open end within the third chamber.

4. A silencer having at least three longitudinally spaced chambers, a first conduit extending into an intermediate chamber and coupled thereto both through its walls and through its open end, said conduit also being coupled to the end chamber through which it passes, a second conduit passing into the second end chamber and coupled thereto both through its walls and through its open end, one or more third conduits connecting the intermediate and second end chambers, and one or more fourth conduits connecting the first end chamber with the second end chamber.

5. A silencer having at least three longitudinally spaced chambers, a first conduit extending into an intermediate chamber and coupled thereto both through its walls and through its open end, said conduit also being coupled to the end chamber through which it passes, a second conduit passing into the second end chamber and coupled thereto both through its walls and through its open end, one or more third conduits connecting the intermediate and second end chambers, and one or more fourth conduits connecting the first end chamber at a point near the periphery thereof with the second end chamber at a point adjacent the second conduit.

6. A silencer having a generally cylindrical casing, three partitions dividing the casing into a first narrow chamber, a second main chamber, a third narrow chamber, and a fourth main chamber, a first conduit extending into the casing, through the first chamber, and terminating in an open end in the third chamber, a second conduit extending from the first chamber through the second chamber and terminating in an open end in the fourth chamber, a plurality of third conduits extending through the third chamber and having open ends within the second and fourth chambers, a fourth conduit extending from the third chamber into the fourth chamber, and a fifth conduit extending through the end of the casing and terminating in an open end within the fourth chamber, there being lateral escape openings formed in the first conduit within the first and second chambers, in the second conduit within the third and fourth chambers, in the third conduit within the third and fourth chambers, and in the fourth and fifth conduits within the fourth chamber.

7. A silencer comprising a first expansion chamber, an inlet conduit opening into the first expansion chamber, a second expansion chamber having an outlet conduit, and being connected to the first chamber by means of one or more conduits, a chamber surrounding said inlet conduit and acoustically coupled thereto through one or more apertures in the conduit, apertures in a wall separating said chamber from said first expansion chamber, and a conduit leading from said chamber directly to the interior of said second expansion chamber.

ROLAND B. BOURNE.
JOHN P. TYSKEWICZ.